United States Patent
Nakazono et al.

(10) Patent No.: US 9,259,969 B2
(45) Date of Patent: Feb. 16, 2016

(54) PNEUMATIC TIRE INCLUDING INNER LINER

(71) Applicant: SUMITOMO RUBBER INDUSTRIES, LTD., Kobe-shi, Hyogo (JP)

(72) Inventors: Takeo Nakazono, Kobe (JP); Mutsuki Sugimoto, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 14/420,866

(22) PCT Filed: Apr. 26, 2013

(86) PCT No.: PCT/JP2013/062382
§ 371 (c)(1),
(2) Date: Feb. 10, 2015

(87) PCT Pub. No.: WO2014/041842
PCT Pub. Date: Mar. 20, 2014

(65) Prior Publication Data
US 2015/0239293 A1 Aug. 27, 2015

(30) Foreign Application Priority Data
Sep. 11, 2012 (JP) .................................. 2012-199644

(51) Int. Cl.
*C08L 53/00* (2006.01)
*B32B 9/04* (2006.01)
(Continued)

(52) U.S. Cl.
CPC ................ *B60C 1/0008* (2013.04); *B32B 25/14* (2013.01); *B60C 1/00* (2013.01); *B60C 1/0016* (2013.04);
(Continued)

(58) Field of Classification Search
CPC ............ B32B 25/14; B60C 1/00; B60C 5/14; B60C 11/0008; B60C 1/0008; B60C 2005/145; C08K 3/30; C08L 7/00; C08L 9/00; C08L 53/02
USPC ........................... 428/411.1; 152/510; 525/89
See application file for complete search history.

(56) References Cited

U.S. PATENT DOCUMENTS

| 4,946,899 A | 8/1990 | Kennedy et al. |
| 5,219,948 A | 6/1993 | Storey et al. |

(Continued)

FOREIGN PATENT DOCUMENTS

| EP | 0 206 756 A2 | 12/1986 |
| EP | 0 397 081 A2 | 11/1990 |

(Continued)

*Primary Examiner* — William Cheung
(74) *Attorney, Agent, or Firm* — Birch, Stewart, Kolasch & Birch, LLP

(57) ABSTRACT

A pneumatic tire including an inner liner made of a polymer sheet is made of a polymer composition. The polymer composition includes a polymer component of a styrene-isobutylene-styrene triblock copolymer by 5 mass % to 40 mass %, and a rubber component of at least one kind selected from the group consisting of natural rubber, isoprene rubber, and isobutylene-isoprene rubber by 20 mass % to 95 mass %, and sulfur by 0.1 mass parts to 5 mass parts with respect to the polymer component by 100 mass parts. The polymer sheet has a thickness of 1.6 mm to 4.0 mm. A tread is made of a rubber composition including carbon black by 60 mass parts to 200 mass parts with respect to 100 mass parts of a rubber component including styrene-butadiene rubber by greater than or equal to 50 mass %.

12 Claims, 2 Drawing Sheets

(51) Int. Cl.

| | | |
|---|---|---|
| *B60C 5/02* | (2006.01) | |
| *B60C 1/00* | (2006.01) | |
| *B32B 25/14* | (2006.01) | |
| *B60C 5/14* | (2006.01) | |
| *C08K 3/30* | (2006.01) | |
| *C08L 7/00* | (2006.01) | |
| *C08L 9/00* | (2006.01) | |
| *B60C 11/00* | (2006.01) | |
| *C08L 53/02* | (2006.01) | |

(52) U.S. Cl.
  CPC ............... *B60C 5/14* (2013.01); *B60C 11/0008* (2013.04); *C08K 3/30* (2013.01); *C08L 7/00* (2013.01); *C08L 9/00* (2013.01); *B60C 2005/145* (2013.04); *C08L 53/02* (2013.01)

(56) References Cited

U.S. PATENT DOCUMENTS 8,656,973 B2 * 2/2014 Sugimoto ................ B60C 5/14
                                                                152/510

| | | | |
|---|---|---|---|
| 2012/0016056 | A1 | 1/2012 | Miyazaki |
| 2012/0024447 | A1 | 2/2012 | Sugimoto |
| 2012/0315408 | A1 | 12/2012 | Chouvel et al. |

FOREIGN PATENT DOCUMENTS

| | | |
|---|---|---|
| EP | 0 265 053 B1 | 10/1996 |
| JP | 62-048704 A | 3/1987 |
| JP | 64-062308 A | 3/1989 |
| JP | 03-174403 A | 7/1991 |
| JP | 09-165469 A | 6/1997 |
| JP | 11-59120 A | 3/1999 |
| JP | 2009-287020 A | 12/2009 |
| JP | 2010-144039 A | 7/2010 |
| JP | 2011-057940 A | 3/2011 |
| JP | 2011-246527 A | 12/2011 |
| JP | 2012-036370 A | 2/2012 |
| JP | 2012-051150 A | 3/2012 |
| JP | 2012-051544 A | 3/2012 |
| JP | 2012-122050 A | 6/2012 |
| WO | WO 2011/076801 A1 | 6/2011 |

* cited by examiner

PNEUMATIC TIRE INCLUDING INNER LINER

This patent application is a U.S. national stage application under 35 U.S.C. Section 371 of International Patent Application No. PCT/JP2013/062382 filed on Apr. 26, 2013, which claims the benefit of foreign priority to Japanese Patent Application No. JP 2012-199644 filed on Sep. 11, 2012, the contents of which are incorporated herein by reference in their entirety.

TECHNICAL FIELD

The present invention relates to a pneumatic tire including an inner liner.

BACKGROUND ART

In recent years, a weight reduction of a tire has been attempted in accordance with strong social requests with respect to a reduction of fuel consumption for a vehicle. Among tire members, a weight reduction has been attempted also for an inner liner which is arranged on an inner side of a tire in a radial direction and serves to improve an air permeation resistance by reducing an amount of leakage of air from inside to outside of a pneumatic tire (air permeation amount).

Currently, as a rubber composition for an inner liner, butyl-based rubber containing isobutylene-isoprene rubber by 70 to 100 mass % and natural rubber by 30 to 0 mass % is used to improve the air permeation resistance of a tire. Moreover, butyl-based rubber contains isoprene by about 1 mass % in addition to butylene, and it enables crosslinking with adjacent rubber cojointly with sulfur, vulcanization accelerator, and zinc white. The butyl-based rubber described above requires in a normal blending a thickness of about 0.6 to 1.0 mm for a tire of a passenger car, and a thickness of about 1.0 to 2.0 mm for a tire of a bus and a truck.

Therefore, it has been proposed to use thermoplastic elastomer, which is superior in an air permeation resistance than butyl-based rubber and is capable of reducing a thickness of an inner liner layer, for an inner liner to reduce a weight of a tire. However, the thermoplastic elastomer, which has a smaller thickness than butyl-based rubber and exhibits a high air permeation resistance, has less vulcanization adherence with insulation rubber or carcass rubber adjacent to the inner liner as compared to butyl-based rubber. When an inner liner has a low vulcanization adherence, an air-in phenomenon occurs in which air is added between an inner liner and an insulation or a carcass to cause a large numbers of small bubbles to appear. Since this phenomenon involves small dot patterns inside of a tire, it disadvantageously gives an impression to a user that an appearance is not good. Further, since an insulation or a carcass is peeled from an inner liner due to air as a starting point during traveling, a crack may occur in the inner liner to lower an internal pressure of the tire. Then, the tire may burst in the worst case.

In PTD 1 (Japanese Patent Laying-Open No. 9-165469), a pneumatic tire is proposed which can improve an adhesiveness between an inner liner and a rubber composition forming an inner portion of a tire or a carcass layer by forming the inner liner layer with use of nylon having a low air permeability. However, in this technique, it would be necessary to apply an RFL treatment to a nylon film and thereafter attach a rubber cement composed of a rubber composition to form a nylon film layer. Thus, steps are complicated disadvantageously.

Moreover, an inner liner portion of a pneumatic tire is likely to generate heat during traveling of a vehicle. Under a high-temperature condition, a stiffness is likely to be lowered, and an operation stability may be deteriorated. Thus, in view of the safety, an inner liner capable of improving the operation stability is also requested.

In PTD 2 (Japanese Patent Laying-Open No. 2011-057940), a tire for competition is proposed which can improve an operation stability by using a rubber composition including carbon black by 30 to 110 mass parts with respect to a rubber component by 100 mass parts. However, this technique should be further reviewed as to its air permeation resistance during continuous use for a long period of time.

CITATION LIST

Patent Document

PTD 1: Japanese Patent Laying-Open No. 9-165469
PTD 1: Japanese Patent Laying-Open No. 2011-057940

SUMMARY OF INVENTION

Technical Problem

An object of the present invention is to provide a pneumatic tire including an inner liner having sufficient non-vulcanization stickiness and vulcanization adhesiveness with an adjacent member and exhibiting a superior air isolation performance, and having a superior gripping performance and an operation stability.

Solution to Problem

The present invention is a pneumatic tire including an inner liner made of a polymer sheet, and the polymer sheet is made of a polymer composition. The polymer composition includes a polymer component of styrene-isobutylene-styrene triblock copolymer by greater than or equal to 5 mass % and less than or equal to 40 mass %, and a rubber component of at least one kind selected from the group consisting of natural rubber, isoprene rubber, and isobutylene-isoprene rubber by greater than or equal to 60 mass % and less than or equal to 95 mass %. The polymer composition includes sulfur by greater than or equal to 0.1 mass parts and less than or equal to 5 mass parts with respect to the polymer component by 100 mass parts. The polymer sheet has a thickness of greater than or equal to 1.6 mm and less than or equal to 4.0 mm. A tread of the pneumatic tire is made of a rubber composition containing carbon black of greater than or equal to 60 mass parts and less than or equal to 200 mass parts with respect to 100 mass parts of a rubber component containing styrene-butadiene rubber by greater than or equal to 50 mass %.

The present invention is a pneumatic tire including an inner liner made of a polymer laminate, and the polymer laminate includes a first layer and a second layer. The first layer is made of a polymer composition. The polymer composition includes a polymer component of a styrene-isobutylene-styrene triblock copolymer by greater than or equal to 5 mass % and less than or equal to 40 mass %, and a rubber component of at least one kind selected from the group consisting of natural rubber, isoprene rubber, and isobutylene-isoprene rubber by greater than or equal to 60 mass % and less than or equal to 95 mass %. The polymer composition includes sulfur by greater than or equal to 0.1 mass parts land less than or equal to 5 mass parts with respect to the polymer component by 100 mass parts. The second layer includes a thermoplastic resin composition, and the thermoplastic resin composition includes sulfur by greater than or equal to 0.1 mass parts and less than or equal to 5 mass parts with respect to thermoplastic elastomer by 100 mass parts. The polymer laminate has a thickness of greater than or equal to 1.6 mm and less than or equal to 4.0 mm. A tread of a pneumatic tire is made of a rubber composition including carbon black of greater than or equal to 60 mass parts and less than or equal to 200 mass parts with respect to a rubber component by 100 mass parts including styrene-butadiene rubber of greater than or equal to 50 mass parts.

Preferably, in the pneumatic tire of the present invention, the thermoplastic elastomer is at least one kind selected from the group consisting of a styrene-isoprene-styrene triblock copolymer, a styrene-isobutylene diblock copolymer, a styrene-butadiene-styrene triblock copolymer, a styrene-isoprene/butadiene-styrene triblock copolymer, a styrene-ethylene/butene-styrene triblock copolymer, a styrene-ethylene/propylene-styrene triblock copolymer, a styrene-ethylene/ethylene/propylene-styrene triblock copolymer, a styrene-butadiene/butylene-styrene triblock copolymer, and epoxy modified thermoplastic elastomers thereof.

Preferably, in the pneumatic tire of the present invention, the styrene-isobutylene-styrene triblock copolymer has a weight-average molecular weight of greater than or equal to 50,000 and less than or equal to 400,000 and a styrene unit content of greater than or equal to 10 mass % and less than or equal to 30 mass %.

Preferably, in the pneumatic tire of the present invention, the styrene-isoprene-styrene triblock copolymer has a weight-average molecular weight of greater than or equal to 100,000 and less than or equal to 290,000 and a styrene unit content of greater than or equal to 10 mass % and less than or equal to 30 mass %.

Preferably, in the pneumatic tire of the present invention, the styrene-isobutylene diblock copolymer has a straight-chain shape, and has a weight-average molecular weight of greater than or equal to 40,000 and less than or equal to 120,000, and a styrene unit content of greater than or equal to 10 mass % and less than or equal to 35 mass %.

Preferably, in the pneumatic tire of the present invention, the epoxy modified styrene-butadiene-styrene triblock copolymer has a weight-average molecular weight of greater than or equal to 10,000 and less than or equal to 400,000 and a styrene unit content of greater than or equal to 10 mass % and less than or equal to 30 mass %.

Preferably, in the pneumatic tire of the present invention, the polymer composition further includes stearic acid by greater than or equal to 1 mass parts and less than or equal to 5 mass parts, zinc oxide by greater than or equal to 0.1 mass parts and less than or equal to 8 mass parts, an anti-aging agent by greater than or equal to 0.1 mass parts and less than or equal to 5 mass parts, and a vulcanization accelerator by greater than or equal to 0.1 mass parts and less than or equal to 5 mass parts with respect to the polymer component by 100 mass parts.

Preferably, in the pneumatic tire of the present invention, the thermoplastic resin composition further includes stearic acid by greater than or equal to 1 mass parts and less than or equal to 5 mass parts, zinc oxide by greater than or equal to 0.1 mass parts and less than or equal to 8 mass parts, an anti-aging agent by greater than or equal to 0.1 mass parts and less than or equal to 5 mass parts, and a vulcanization accelerator by greater than or equal to 0.1 mass parts and less than or equal to 5 mass parts with respect to the thermoplastic elastomer by 100 mass parts.

Preferably, in the pneumatic tire of the present invention, the second layer further includes, in addition to the thermoplastic resin composition, a rubber component of at least one kind selected from the group consisting of natural rubber, isoprene rubber, and isobutylene-isoprene rubber, and includes the rubber content by greater than or equal to 20 mass % and less than or equal to 90 mass % with respect to a sum total of the thermoplastic resin composition and the rubber component.

Advantageous Effects of Invention

According to the present invention, a pneumatic tire can be provided which includes an inner liner having sufficient non-vulcanization stickiness and vulcanization adhesiveness with an adjacent member and exhibiting a superior air isolation performance, and has a superior gripping performance and an operation stability.

DESCRIPTION OF EMBODIMENTS

<Pneumatic Tire>

Figure 1:
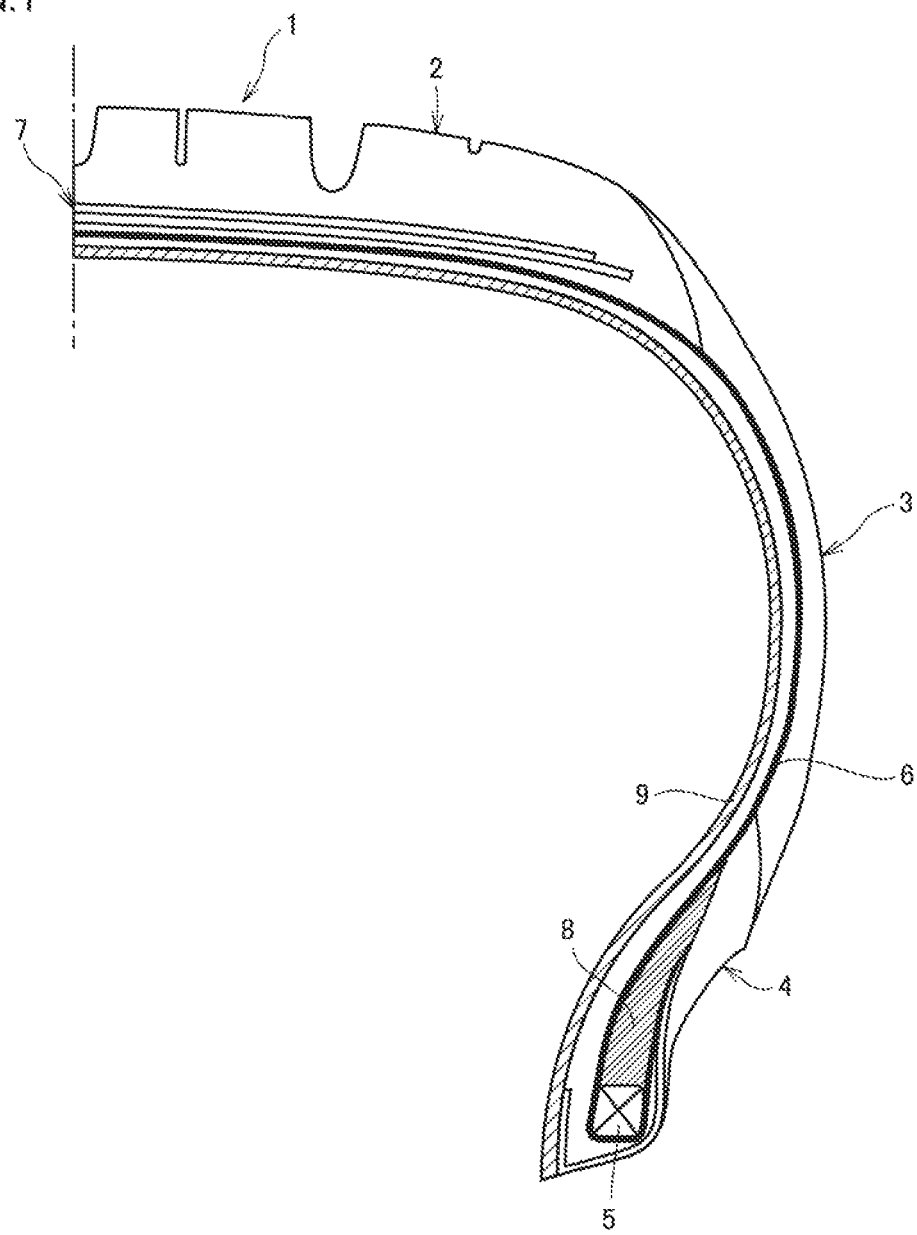
FIG. 1 is a schematic cross-sectional view representing a right half of a pneumatic tire in one embodiment of the present invention.

A structure of a pneumatic tire in one embodiment of the present invention will be described with reference to FIG. 1.

A pneumatic tire 1 may be used for a passenger car, a truck/bus, and a heavy machinery. Pneumatic tire 1 has a tread portion 2, a side wall portion 3, and a bead portion 4. Further, a bead core 5 is embedded in bead portion 4. Moreover, a carcass 6 provided across one bead portion 4 to the other bead portion and having both ends folded to engage with bead core 5, and a belt layer 7 constituted of two plies on an outer side of a crown portion of carcass 6 are arranged. On an inner side of carcass 6 in a radial direction of the tire, an inner liner 9 extending from one bead portion 4 to the other bead portion 4 is arranged. Belt layer 7 is arranged so that two plies constituted of steel cords or aramid fibers intersect each other between the plies to have the cords typically oriented at the angle of 5 to 30 degrees with respect to the circumferential direction of the tire. Moreover, the carcass have organic fiber cords of polyester, nylon, aramid, or the like disposed at approximately 90° in the circumferential direction, and a bead apex 8 extending from an upper end of bead core 5 in the side wall direction is arranged in the region surrounded by the carcass and folded portions of the carcass. An insulation may be arranged between inner liner 9 and carcass 6.

First Embodiment

In one embodiment of the present invention, an inner liner is made of a polymer sheet.

<Polymer Sheet>

The polymer sheet is made of a polymer composition. In the polymer composition, a polymer component includes a styrene-isobutylene-styrene triblock copolymer (in the following, also referred to as "SIBS") by greater than or equal to 5 mass % and less than or equal to 40 mass %, and a rubber component of at least one kind selected from the group consisting of natural rubber, isoprene rubber, and isobutylene-isoprene rubber by greater than or equal to 60 mass % and less than or equal to 95%. Further, the polymer composition includes sulfur by greater than or equal to 0.1 mass parts and less than or equal to 5 mass parts with respect to the polymer component by 100 mass parts.

(Polymer Composition)

The polymer composition includes SIBS, a rubber component, and sulfur. When the rubber component and sulfur are added to the SIBS and then heated and mixed, a vulcanization reaction occurs between the rubber component and sulfur during heating and mixing, so that a sea-island structure is formed which has SIBS as a matrix (sea) and the rubber component as an island.

The polymer composition having the sea-island structure has an air isolation performance derived from a matrix phase of SIBS. Further, the rubber component forming an island phase has a non-vulcanization stickiness with an adjacent member including a rubber component. Moreover, since a vulcanization reaction with the rubber component of an adjacent member occurs during heating and mixing, it also has a vulcanization adhesiveness with an adjacent member. Thus, the polymer sheet made of the polymer composition is superior in an air isolation performance as well as a non-vulcanization stickiness and a vulcanization adhesiveness with an adjacent member.

(Styrene-Isobutylene Triblock Copolymer)

The isobutylene block of SIBS provides a superior air permeation resistance to a polymer sheet including the SIBS. Thus, when a polymer sheet including SIBS is used for an inner liner, a pneumatic tire having a superior air permeation resistance can be obtained.

Further, since a molecular structure of SIBS other than aromatic series is completely saturated, deterioration hardening is suppressed, and a superior durability is provided. Thus, when a polymer sheet including SIBS is used for an inner liner, a pneumatic tire having a superior durability can be obtained.

When a pneumatic tire is manufactured by applying a polymer sheet including SIBS to an inner liner, the inclusion of SIBS assures an air permeation resistance. Therefore, high-density halogenated rubber such as halogenated isobutylene-isoprene rubber having been conventionally used for providing an air permeation resistance is not used. Even when the high-density halogenated rubber is used, the amount of use can be reduced. Accordingly, a tire can be light-weighted, and an effect of improving fuel consumption can be obtained.

A molecular weight of the SIBS is not particularly limited. However, in view of a fluidity, a molding step, and a rubber elasticity, it is preferable that a weight-average molecular weight according to the GPC method is greater than or equal to 50,000 and less than or equal to 400,000. When the weight-average molecular weight is less than 50,000, a tensile strength and a tensile elongation are likely to be lowered. When the weight-average molecular weight exceeds 400,000, an extrusion performance may be deteriorated. Thus, it is not preferable.

SIGBS generally includes a styrene unit of greater than or equal to 10 mass % and less than or equal to 40 mass %. On the point that an air permeation resistance and a durability become more favorable, it is preferable that the content of the styrene unit in SIBS is greater than or equal to 10 mass % and less than or equal to 30 mass %.

It is preferable that SIBS has a molar ratio of an isobutylene unit and a styrene unit (isobutylene unit/styrene unit) of 40/60 to 95/5 in view of the rubber elasticity of the copolymer. In SIBS, it is preferable that a degree of polymerization of each block is approximately 10,000 to 150,000 in an isobutylene block (it is liquefied when the degree of polymerization is less than 10,000) and 5,000 to 30,000 in a styrene block in view of the rubber elasticity and handling.

SIBS can be obtained by a general method for polymerizing a vinyl-based compound. For example, it can be obtained by a living cationic polymerization method.

Japanese Patent Laying-Open No. 62-48704 and Japanese Patent Laying-Open No. 64-62308 disclose that the living cationic polymerization of isobutylene and other vinyl compound can be conducted, and that a polyisobutylene-based block copolymer can be manufactured by using isobutylene and other compound for a vinyl compound. Other than those described above, methods for manufacturing a vinyl compound with use of the living cationic polymerization method are disclosed in, for example, U.S. Pat. No. 4,946,899, U.S. Pat. No. 5,219,948, and Japanese Patent Laying-Open No. 3-174403.

Since SIBS does not have a double bond other than the aromatic series in a molecule, a stability with respect to an ultraviolet radiation is higher and a weather resistance is better than a polymer such as polybutadiene having a double bond in a molecule.

The content of SIBS is greater than or equal to 5 mass % and less than or equal to 40 mass % in the polymer component of the polymer composition. When the content of SIBS is less than 5 mass %, an air isolation performance of the polymer sheet may be lowered. On the other hand, when the content of SIBS exceeds 80 mass %, a vulcanization adhesiveness with an adjacent member may be insufficient. In view of assuring the air isolation performance, the content of SIBS in the polymer component is preferably greater than or equal to 10 mass %, and preferably less than or equal to 30 mass %.

(Rubber Component)

In First Embodiment, the polymer composition constituting the polymer sheet includes a rubber component. The rubber component can provide the polymer composition with a non-vulcanization stickiness with an adjacent member including a rubber component. Further, a vulcanization reaction with sulfur can provide the polymer composition with a vulcanization adhesiveness with an adjacent member such as a carcass or an insulation.

The rubber component includes at least one kind selected from the group consisting of natural rubber, isoprene rubber, and isobutylene-isoprene rubber. Among those, it is preferable to include natural rubber in view of a fracture strength and an adhesiveness.

The content of the rubber component is greater than or equal to 60 mass % and less than or equal to 95 mass % in the polymer component of the polymer composition. When the content of the rubber component is less than 60 mass %, a viscosity of the polymer composition is raised, and an extrusion performance is deteriorated. Therefore, a polymer sheet is not to be thinned at the time of manufacturing the polymer sheet. On the other hand, when the content of the rubber component exceeds 95 mass %, the air isolation performance of the polymer sheet may be lowered. In view of the non-vulcanization stickiness and the vulcanization adhesiveness, the content of the rubber component in the polymer component is preferably greater than or equal to 70 mass %, and preferably less than or equal to 90 mass %.

(Sulfur)

In First Embodiment, the polymer composition constituting the polymer sheet includes sulfur.

As sulfur, sulfur generally used in a rubber industry at the time of vulcanization may be used. Particularly, it is preferable to use insoluble sulfur. The insoluble sulfur is sulfur having a high molecular weight of Sx (x=100,000 to 300,000) by heating and quenching natural sulfur S8. Using the insoluble sulfur can prevent blooming which generally occurs when sulfur is used as a rubber vulcanizing agent.

The content of sulfur is greater than or equal to 0.1 mass parts and less than or equal to 5 mass parts with respect to the polymer component by 100 mass parts. When the content of sulfur is less than 0.1 mass parts, a vulcanizing effect of the rubber component cannot be obtained. On the other hand, when the content of sulfur exceeds 5 mass parts, a hardness of the polymer composition increases. Therefore, when the polymer sheet is used for the inner liner, a durability of the pneumatic tire is likely to be lowered. More preferably, the content of sulfur is greater than or equal to 0.3 mass parts and less than or equal to 3.0 mass parts.

(Additive of Polymer Composition)

In First Embodiment, the polymer composition constituting the polymer sheet can include an additive such as stearic acid, zinc oxide, an anti-aging agent, a vulcanization accelerator, or the like.

The stearic acid serves as a vulcanization assistant for the rubber component. The content of the stearic acid is preferably greater than or equal to 1 mass parts and less than or equal to 5 mass parts with respect to the polymer component by 100 mass parts. When the content of the stearic acid is less than 1 mass parts, an effect as a vulcanization assistant cannot be obtained. On the other hand, when the content of the stearic acid exceeds 5 mass parts, a viscosity of the polymer composition is lowered, and a fracture strength is lowered, thus it is not preferable. More preferably, the content of the stearic acid is greater than or equal to 1 mass parts and less than or equal to 4 mass parts.

Zinc oxide serves as a vulcanization assistant of the rubber component. The content of zinc oxide is preferably greater than or equal to 0.1 mass parts and less than or equal to 8 mass parts with respect to the polymer component by 100 mass parts. When the content of zinc oxide is less than 0.1 mass parts, an effect as a vulcanization assistant cannot be obtained. On the other hand, when the content of zinc oxide exceeds 8 mass parts, a hardness of the polymer composition is raised. Therefore, when the polymer sheet is used for the inner liner, a durability of the pneumatic tire may be lowered. More preferably, the content of zinc oxide is greater than or equal to 0.5 mass parts and less than or equal to 6 mass parts.

The anti-aging agent has a function of preventing a series of deterioration such as oxidation deterioration, heat deterioration, ozone deterioration, and fatigue deterioration, which are called aging. The anti-aging agent is grouped into a primary anti-aging agent including amines and phenols, and a secondary anti-aging agent including a sulfur compound and phosphites. The primary anti-aging agent has a function of providing hydrogen to various polymer radicals and stopping a chain reaction of autoxidation, and the secondary anti-aging agent exhibits a stabilizing action of changing hydroxy peroxide into stable alcohol.

The anti-aging agent includes amines, phenols, imidazoles, phosphorous, and thio urea.

The amines include phenyl-α-naphthylamine, a 2,2,4-trimethyl-1,2-dihydroquinoline polymer, 6-ethoxy-2,2,4-trimethyl-1,2-dihydroquinoline, p,p'-dioctyl diphenylamine, p,p'-dicumyl diphenylamine, N,N'-di-2-naphthyl-p-phenylenediamine, N,N'-diphenyl-p-phenylenediamine, N-phenyl-N'-isopropyl-p-phenylenediamine, N-phenyl-N'-1,3-dimethyl butyl-p-phenylenediamine, N-(1,3-dimethyl butyl)-N'-phenyl-p-phenylenediamine, and the like.

Phenols include 2,6-di-tert-butyl-4-methyl phenol, 2,6-di-tert-butyl-4-methyl phenol, styrenated methyl phenol, 2,2'-methylene his (4-ethyl-6-tert-butyl phenol), 2,2'-methylene bis (4-methyl-6-tert-butyl phenol), 4,4'-butylidene his (3-methyl-6-tert-butyl phenol), 4,4-thio bis (3-methyl-6-tert-butyl phenol), 2,5-di-tert-butyl hydroquinone, 2,5-di-tert-amyl hydroquinone, and the like.

Imidazoles include 2-mercaptobenzimidazole, zinc salt of 2-mercaptobenzimidazole, dibutyl dithiocarbamate nickel, and the like.

Other than those described above, phosphorous such as tris (nonylated phenyl)phosphite, thio urea such as 1,3-bis (dimethylaminopropyl)-2-thio urea, and tributyl thio urea, ozone deterioration prevention wax, and the like may be used.

The anti-aging agents described above may be used individually with one kind or in combination of two or more kinds. Among those, it is preferable to use N-(1,3-dimethyl butyl)-N'-phenyl-p-phenylenediamine.

It is preferable that the content of the anti-aging agent is greater than or equal to 0.1 mass parts and less than or equal to 5 mass parts with respect to the polymer component by 100 mass parts. When the content of the anti-aging agent is less than 0.1 mass parts, the anti-aging effect cannot be obtained. On the other hand, when the content of the anti-aging agent exceeds 5 mass parts, a blooming phenomenon occurs in the polymer composition. It is more preferable that the content of the anti-aging agent is greater than or equal to 0.3 mass parts and less than or equal to 4 mass parts.

As the vulcanization accelerator, thiurams, thiazoles, thio urea, dithiocarbamates, guanidines, sulfenamides, and the like can be used.

The thiurams include tetramethyl thiuram monosulfide, tetramethyl thiuram disulfide, tetraethyl thiuram disulfide, tetrabutyl thiuram disulfide, dipentamethylene thiuram tetrasulfide, and the like.

The thiazoles include 2-mercaptobenzothiazole, dibenzothiadyl disulfide, N-cyclohexyl benzothiazole, N-cyclohexyl-2-benzothiazole sulfenamide, N-oxydiethylene-2-benzothiazole sulfenamide, N-tert-butyl-2-benzothiazole sulfenamide, N,N-dicyclohexyl-2-benzothiazole sulfenamide, N-tert-butyl-2-benzothiazolyl sulfenamide, and the like.

The thio urea includes N,N'-diethyl thiourea, ethylene thio urea, trimethyl thio urea, and the like.

The dithiocarbamates include dimethyl dithiocarbamate zinc, diethyl dithiocarbamate zinc, dibutyl dithiocarbamate zinc, dimethyl dithiocarbamate sodium, diethyl dithiocarbamate sodium, dimethyl dithiocarbamate copper, dimethyl dithiocarbamate iron (III), diethyl dithiocarbamate selenium, diethyl dithiocarbamate tellurium, and the like.

The guanidines include di-o-tolylguanidine, 1,3-diphenylguanidine, 1-o-tolylbiguanide, di-o-tolylguanidine salt of dicatechol borate, and the like.

The sulfenamides include N-cyclohexyl-2-benzothiazilsulfenamide, and the like.

The vulcanization accelerator described above may be used individually with one kind or in combination of two or more kinds. Among those, it is preferable to use dibenzothiazyl disulfide.

Preferably, the content of the vulcanization accelerator is greater than or equal to 0.1 mass parts and less than or equal to 5 mass parts with respect to the polymer component by 100 mass parts. When the content of the vulcanization accelerator is less than 0.1 mass parts, the vulcanization accelerating effect cannot be obtained. On the other hand, when the content of the vulcanization accelerator exceeds 5 mass parts, a hardness of the polymer composition is raised. Therefore, when the polymer sheet is used for the inner liner, a durability of the pneumatic tire may be lowered. Further, the raw material cost of the polymer composition is raised. More preferably, the content of the vulcanization accelerator is greater than or equal to 0.3 mass parts and less than or equal to 4 mass parts.

(Thickness of Polymer Sheet)

In First Embodiment, the polymer sheet has a thickness of greater than or equal to 1.6 mm and less than or equal to 4.0 mm. When the thickness of the polymer sheet is less than 1.6 mm, a favorable operation stability cannot be obtained in the pneumatic tire having the polymer sheet applied to the inner liner.

On the other hand, when the thickness of the polymer sheet exceeds 4.0 mm, a flexure of the tire is smaller, so that a favorable gripping performance cannot be obtained. Further, a tire weight and a rolling resistance are increased, so that the low fuel consumption performance is lowered. It is preferable that the thickness of the polymer sheet is greater than or equal to 2.0 mm and less than or equal to 3.0 mm.

(Method for Manufacturing Polymer Sheet)

In First Embodiment, the polymer sheet can be manufactured, for example, by the following method. Each compounding agent is placed into a two-axis extruder and kneaded under the condition of about 150 to 280° C. and 50 to 300 rpm to obtain a pellet of a polymer composition having dynamically crosslinked SIBS, rubber component, sulfur, and various additives as needed. The obtained pellet is placed into a T-die extruder to obtain a polymer sheet having a desired thickness.

In the two-axis extruder, SIBS as a thermoplastic resin composition attains a matrix phase, and the rubber component attains an island phase. Then, they are dispersed. Further, in the two-axis extruder, the rubber component and the additive component react with each other, so that a crosslinking reaction occurs in the rubber component in an island phase. Since the rubber component is dynamically crosslinked in the two-axis extruder, it is called dynamic crosslinking. Even when the rubber component crosslinks in the two-axis extruder, since the matrix phase of the system is composed of the thermoplastic resin component, a shear viscosity is low in the whole system, and extrusion can be conducted.

The pellet of the dynamically crosslinked polymer composition obtained by the two-axis extruder includes the crosslinked rubber component. However, the thermoplastic resin component in the matrix phase maintains its plasticity and serves to provide a plasticity for the whole system. Therefore, since the plasticity is exhibited in the T-die extrusion, it can be formed into a sheet-like shape.

Further, since the pellet of the dynamically crosslinked polymer composition has the crosslinked rubber component, intrusion of the polymer composition of the inner liner to the carcass layer can be prevented even when the polymer sheet manufactured with use of the pellet is applied to the inner layer and the pneumatic tire is heated at the time of manufacturing the pneumatic tire.

<Tread>

In one embodiment of the present invention, the tread of the pneumatic tire is made of a rubber component including styrene-butadiene rubber (in the following, also referred to as "SBR") by greater than or equal to 50 mass % and carbon black.

The SBR is not particularly limited, and SBR generally used in a tire industry such as emulsion-polymerized styrene-butadiene rubber (E-SBR), solution-polymerized styrene-butadiene rubber (S-SBR), and the like can be used. Among those, S-SBR is preferable.

The styrene unit content of the SBR is preferably greater than or equal to 25 mass %, and more preferably greater than or equal to 35 mass %. When the content is less than 25 mass %, there is a tendency that a sufficient griping performance cannot be obtained. Moreover, the styrene component content is preferably less than or equal to 60 mass %, and more preferably less than or equal to 50 mass %. There is a tendency that a wear resistance is lowered when the content exceeds 60 mass %. The styrene component content of the SBR is calculated by the 1H-NMR measurement.

The content of the SBR in the rubber component by 100 mass % is preferably greater than or equal to 50 mass %, more preferably greater than or equal to 70 mass %, and yet more preferably greater than or equal to 80 mass %. There is a tendency that a sufficient gripping performance cannot be obtained when the content is less than 50 mass %. Moreover, an upper limit of the content of SBR is not particularly limited, and it may be 100 mass %.

As the rubber component other than SBR, there may be used, for example, natural rubber (NR), isoprene rubber (IR), butadiene rubber (BR), styrene isoprene butadiene rubber (SIBR), ethylene propylene diene rubber (EPDM), chloroprene rubber (CR), acrylonitrile-butadiene rubber (NBR), isobutylene-isoprene rubber (IIR), and the like. These rubber components may be used individually or in combination of two or more kinds.

The tread rubber composition includes carbon black. Accordingly, a favorable dry-grip performance and a wear resistance can be obtained. As the carbon black, carbon black generally used in a tire industry such as GPF, HAF, ISAF, SAF, or the like can be used.

A nitrogen adsorption specific surface area ($N_2SA$) of carbon black is preferably greater than or equal to 50 $m^2/g$, more preferably greater than or equal to 90 $m^2/g$, yet more preferably greater than or equal to 120 $m^2/g$. It is likely that sufficient wet-grip performance and wear resistance performance cannot be obtained when it is less than 50 $m^2/g$. The $N_2SA$ is preferably less than or equal to 180 $m^2/g$, more preferably less than or equal to 160 $m^2/g$. When it exceeds 180 $m^2/g$, there is a tendency that it becomes difficult to disperse and the wear resistance is deteriorated. The $N_2SA$ of carbon black is a value calculated by JIS K 6217-2:2001.

A dibutyl phthalate oil absorption (DBP) of carbon black is preferably greater than or equal to 50 ml/100 g, more preferably greater than or equal to 100 ml/100 g. When it is less than 50 ml/100 g, it is likely that sufficient wet-grip performance and wear resistance performance cannot be obtained. Moreover, the DBP of carbon black is preferably less than or equal to 200 ml/100 g, and more preferably less than or equal to 135 ml/100 g. When it exceeds 200 ml/100 g, there is a tendency that it becomes difficult to disperse and the wear resistance is deteriorated.

The DBP of carbon black is a value measured in accordance with JIS K 6217-4:2001.

The content of carbon black is greater than or equal to 60 mass parts and less than or equal to 200 mass parts with respect to the rubber component by 100 mass parts. When it is less than 60 mass parts, it is likely that sufficient gripping performance and wear resistance performance cannot be obtained. When it exceeds 200 mass parts, it is likely that it becomes difficult to disperse and the wear resistance is deteriorated. The content is preferable greater than or equal to 70 mass parts, and less than or equal to 180 mass parts, more preferably less than or equal to 130 mass parts.

The tread rubber composition can include silica. Accordingly, the wet-grip performance can be improved, and the effect of improving the wear resistance and operation stability can be obtained, so that the effect of the present invention can be obtained more favorably. Silica includes, for example, dry silica (anhydrous silica), wet silica (hydrous silica), and the like. Among those, the wet silica is preferable on the reason that there are many silanol groups.

A nitrogen absorption specific surface area ($N_2SA$) of silica is preferably greater than or equal to 40 $m^2/g$, more preferably greater than or equal to 70 $m^2/g$, yet more preferably greater than or equal to 110 $m^2/g$. There is a tendency that the wear resistance is lowered when the area is less than 40 $m^2/g$. Moreover, the $N_2SA$ of silica is preferably less than or equal to 220 $m^2/g$, and more preferably less than or equal to 200 $m^2/g$. When the area exceeds 220 $m^2/g$, silica becomes less likely to disperse, and the wear resistance may be deteriorated. The $N_2SA$ of silica is a value measured by the BET method in accordance with ASTM D3037-93.

The content of silica is preferably greater than or equal to 15 mass parts, more preferably greater than or equal to 20 mass parts with respect to the rubber component by 100 mass parts. When the content is less than 15 mass parts, sufficient wet-grip performance and wear resistance may not be obtained. The content of the silica is preferably less than or equal to 150 mass parts, more preferably less than or equal to 140 mass parts, yet more preferably less than or equal to 130 mass parts. When the content exceeds 150 mass parts, silica becomes less likely to disperse, and the wear resistance may be deteriorated.

When silica is blended to the tread rubber composition, it is preferable to blend a silane coupling agent with silica. The silane coupling agent is not particularly limited, and it may be the silane coupling agent conventionally used with silica in the tire industry.

The silane coupling agent includes, for example, bis (3-triethoxysilyl propyl)polysulfide, bis (2-triethoxysilyl ethyl) polysulfide, bis (3-trimethoxysilyl propyl)polysulfide, bis (2-trimethoxysilyl ethyl)polysulfide, bis (4-triethoxysilyl butyl)polysulfide, bis (4-trimethoxysilyl butyl)polysulfide, and the like. These silane coupling agents may be used individually or in combination of two or more kinds. In view of the effect of adding the silane coupling agent and the aspect of cost, it is preferable to use his (3-triethoxysilyl propyl)disulfide.

The content of the silane coupling agent is preferably greater than or equal to 1 mass part, more preferably greater than or equal to 2 mass parts with respect to silica by 100 mass parts. There is a tendency that the wear resistance is likely to be lowered when the content of the silane coupling agent is less than 1 mass parts. Moreover, the content of the silane coupling agent is preferably less than or equal to 20 weight parts, more preferably less than or equal to 15 weight parts. When the content of the silane coupling agent exceeds 20 weight parts, there is a tendency that the improving effect by blending of the silane coupling agent cannot be obtained and the cost is increased.

The tread rubber composition can be manufactured by a conventionally known method. For example, a rubber component, carbon black, and optionally other filler and compounding agent are kneaded in, for example, a Banbury mixer. A curing agent and a vulcanization accelerator are kneaded with respect to the obtained kneaded material in an open roll, and further vulcanized, so that the tread rubber composition can be obtained.

Second Embodiment

In one embodiment of the present invention, the inner liner is made of a polymer laminate.

<Polymer Laminate>

The polymer laminate includes a first layer and a second layer.

(First Layer)

In Second Embodiment, the first layer of the polymer laminate may be used which is similar to the polymer sheet of First Embodiment.

(Second Layer)

In Second Embodiment, the second layer includes a thermoplastic resin composition having thermoplastic elastomer and sulfur. The second layer may further include, in addition to the thermoplastic resin composition, a rubber component of at least one kind selected from the group consisting of natural rubber, isoprene rubber, and isobutylene-isoprene rubber.

(Thermoplastic Resin Composition)

The thermoplastic resin composition includes thermoplastic elastomer and sulfur. By adding sulfur to thermoplastic elastomer, a non-vulcanization stickiness and a vulcanization adhesiveness with the first layer are improved. Further, a non-vulcanization stickiness and a vulcanization adhesiveness with an adjacent member such as a carcass or an insulation are also improved.

(Thermoplastic Elastomer)

The thermoplastic elastomer which can be used may be at least one kind selected from the group consisting of a styrene-isoprene-styrene triblock copolymer, a styrene-isobutylene diblock copolymer, a styrene-butadiene-styrene triblock copolymer, a styrene-isoprene/butadiene-styrene triblock copolymer, a styrene-ethylene/butene-styrene triblock copolymer, a styrene-ethylene/propylene-styrene triblock copolymer, a styrene-ethylene/ethylene/propylene-styrene triblock copolymer, and a styrene-butadiene/butylene-styrene triblock copolymer. These thermoplastic elastomers may be an epoxy modified thermoplastic elastomer having an epoxy group. Among those, it is preferable to use the styrene-isoprene-styrene triblock copolymer, the styrene-isobutylene diblock copolymer, or the epoxy modified styrene-butadiene-styrene triblock copolymer. In the following, the styrene-isoprene-styrene triblock copolymer, the styrene-isobutylene diblock copolymer, and the epoxy modified styrene butadiene styrene triblock copolymer will be described.

(Styrene-Isoprene-Styrene Triblock Copolymer)

Since an isoprene block of the styrene-isoprene-styrene triblock copolymer (in the following, also referred to as "SIS") is a soft segment, the thermoplastic resin composition including SIS is likely to exhibit a vulcanization adhesion to the rubber component. Thus, when the thermoplastic resin composition including SIS is used for the polymer laminate, since the polymer laminate is superior in an adhesiveness with an adjacent rubber forming the carcass or insulation, a pneumatic tire capable of preventing the air-in and superior in the durability can be obtained.

The molecular weight of SIS is not particularly limited. However, in view of the rubber elasticity and moldability, it is preferable that the weight-average molecular weight according to the GPC method is greater than or equal to 100,000 and less than or equal to 290,000. When the weight-average molecular weight is less than 100,000, the tensile strength is likely to be lowered. When the weight-average molecular weight exceeds 290,000, the extrusion performance is deteriorated. Therefore, it is not preferable.

It is preferable that the content of the styrene unit in the SIS is greater than or equal to 10 mass % and less than or equal to 30 mass % in view of the stickiness, adhesiveness, and rubber elasticity.

It is preferable that SIS has a molar ratio of the isoprene unit and the styrene unit (isoprene unit/styrene unit) of 90/10 to 70/30. In SIS, it is preferable that a degree of polymerization of each block is approximately 500 to 5,000 for the isoprene block and approximately 50 to 1,500 for the styrene block in view of the rubber elasticity and handling.

SIS can be obtained by a general method for polymerizing a vinyl-based compound. For example, it can be obtained by, for example, the living cationic polymerization method.

The second layer including SIS can be obtained by a general method of mixing SIS, sulfur, and other additive in a Banbury mixer and forming a sheet of thermoplastic resin and thermoplastic elastomer by extrusion and calender molding.

(Styrene-Isobutylene Diblock Copolymer)

Since the isobutylene block of the styrene-isobutylene-diblock copolymer (in the following, also referred to as "SIB") is a soft segment, the thermoplastic resin composition including SIB is likely to exhibit a vulcanization-adhesion to a rubber component. Thus, when the thermoplastic resin composition including SIB is used for the polymer laminate, since the polymer laminate is superior in an adhesiveness with adjacent rubber forming a carcass and an insulation for example, the air-in can be prevented, and a pneumatic tire superior in the durability can be obtained.

As SIB, it is preferable to use SIB having a straight chain shape in view of the rubber elasticity and the adhesiveness.

Although the molecular weight of SIB is not particularly limited, it is preferable that the weight-average molecular weight according to the GPC method is greater than or equal to 40,000 and less than or equal to 120,000 in view of the rubber elasticity and the moldability. When the weight-average molecular weight is less than 40,000, the tensile strength is likely to be lowered. When the weight-average molecular weight exceeds 120,000, the extrusion property is likely to be deteriorated. Thus, it is not preferable.

It is preferable that the content of the styrene unit in SIB is greater than or equal to 10 mass % and less than or equal to 35 mass % in view of the stickiness, the adhesiveness, and the rubber elasticity.

It is preferable that SIB has a molar ratio of the isobutylene unit and the styrene unit (isobutylene unit/styrene unit) of 90/10 to 65/35. In SIB, it is preferable that a degree of polymerization for each block is approximately 300 to 3,000 for the isobutylene block and approximately 10 to 1,500 for the styrene block in view of the rubber elasticity and handling.

SIB can be obtained by the general method for polymerizing a vinyl-based compound. For example, it can be obtained by the living cationic polymerization method.

WO2005/033035 discloses a manufacturing method for obtaining SIB by adding methylcyclohexane, n-butyl chloride, and cumyl chloride to an agitator, cooling to −70° C., allowing a reaction to be performed for two hours, adding a large amount of methanol to stop the reaction, and performing vacuum-drying at 60° C.

The second layer including SIB can be obtained by a general method of mixing SIB, sulfur, and other additive in the Banbury mixer, and forming a sheet of thermoplastic resin and thermoplastic elastomer by extrusion and calender molding.

(Epoxy Modified Styrene-Butadiene-Styrene Triblock Copolymer)

The epoxy modified styrene-butadiene-styrene triblock copolymer (in the following, also referred to as "epoxy modified SBS") is thermoplastic elastomer having a polystyrene block as a hard segment and a butadiene block as a soft segment, and a non-saturated double-bond portion included in the butadiene block is epoxidated. Since epoxy modified SBS has a soft segment, the thermoplastic resin composition including epoxy modified SBS is likely to exhibit a vulcanization adhesion to the rubber component. Thus, when the thermoplastic resin composition including epoxy modified SBS is used for the polymer laminate for an inner liner, since the polymer laminate is superior in the adhesiveness with adjacent rubber forming a carcass or an insulation for example, the air-in can be prevented, and a pneumatic tire superior in the durability can be obtained.

Although the molecular weight of epoxy modified SBS is not particularly limited, it is preferable that the weight-average molecular weight according to the GPC method is greater than or equal to 10,000 and less than or equal to 400,000 in view of the rubber elasticity and the moldability. When the weight-average molecular weight is less than 10,000, the reinforcing effect may be lowered. When the weight-average molecular weight exceeds 400,000, the viscosity of the thermoplastic resin composition may be raised. Therefore, it is not preferable.

It is preferable that the content of the styrene unit in epoxy modified SBS is greater than or equal to 10 mass % and less than or equal to 30 mass % in view of the stickiness, the adhesiveness, and the rubber elasticity.

It is preferable that epoxy modified SBS has a molar ratio of the butadiene unit and the styrene unit (butadiene unit/styrene unit) of 90/10 to 70/30. In epoxy modified SBS, it is preferable that a degree of polymerization of each block is approximately 500 to 5,000 for the butadiene block and approximately 50 to 1,500 for the styrene block in view of the rubber elasticity and handling.

The second layer including epoxy modified SBS can be obtained by a general method of mixing SIB, sulfur, and other additive in the Banbury mixer and forming a sheet of thermoplastic resin and thermoplastic elastomer by extrusion and calender molding.

(Rubber Component)

The second layer can include a rubber component in addition to the thermoplastic elastomer composition.

As the rubber component, rubber of at least one kind selected from the group consisting of natural rubber, isoprene rubber, and isobutylene-isoprene rubber can be used.

It is preferable that the content of the rubber component is greater than or equal to 20 mass % and less than or equal to 90 mass %, more preferably greater than or equal to 30 mass % and less than or equal to 80 mass % with respect to the sum total of the thermoplastic resin composition and the rubber component. When it is less than 20 mass %, the second layer is less likely to exhibit a vulcanization adhesion to the carcass layer. When it exceeds 90 mass %, the second layer and the carcass layer are likely to exhibit a vulcanization adhesion too much.

(Sulfur)

Sulfur which is similar to that of First Embodiment can be used.

The content of sulfur is greater than or equal to 0.1 mass parts and less than or equal to 5 mass parts with respect to the thermoplastic elastomer by 100 mass parts. When the content of sulfur is less than 0.1 mass parts, the crosslinking reaction may not occur. On the other hand, when the content of sulfur exceeds 5 mass parts, the crosslinking density of the thermoplastic resin composition may be raised, and the viscosity may be raised. It is more preferable that the content of sulfur is greater than or equal t0 0.3 mass parts and less than or equal to 3 mass parts.

(Additive of Thermoplastic Resin Composition)

In Second Embodiment, the thermoplastic resin composition constituting the polymer laminate for the inner liner can include additive such as stearic acid, zinc oxide, an anti-aging agent, and a vulcanization accelerator. These additives can be similar to those of First Embodiment.

It is preferable that the content of the stearic acid is greater than or equal to 1 mass parts and less than or equal to 5 mass parts with respect to the thermoplastic elastomer by 100 mass parts. When the content of the stearic acid is less than 1 mass part, the vulcanization may not occur. On the other hand, when the content of the stearic acid exceeds 5 mass parts, the fracture strength of the thermoplastic resin composition may be lowered. It is more preferable that the content of the stearic acid is greater than or equal to 1 mass parts and less than or equal to 4 mass parts.

It is preferable that the content of zinc oxide is greater than or equal to 0.1 mass parts and less than or equal to 8 mass parts with respect to the thermoplastic elastomer by 100 mass parts. When the content of zinc oxide is less than 0.1 mass parts, the vulcanization may not be performed. On the other hand, when the content of zinc oxide exceeds 8 mass parts, the hardness of the thermoplastic resin composition may be raised, and the durability may be lowered. It is more preferable that the content of zinc oxide is greater than or equal to 0.5 mass parts and less than or equal to 6 mass parts.

It is preferable that the content of the anti-aging agent is greater than or equal to 0.1 mass parts and less than or equal to 5 mass parts with respect to the thermoplastic elastomer by 100 mass parts. When the content of the anti-aging agent is less than 0.1 mass parts, the anti-aging effect may not be obtained. On the other hand, when the content of the anti-aging agent exceeds 5 mass parts, the blooming phenomenon may occur. It is more preferable that the content of the anti-aging agent is greater than or equal to 0.3 mass parts and less than or equal to 4 mass parts.

It is preferable that the content of the vulcanization accelerator is greater than or equal to 0.1 mass parts and less than or equal to 5 mass parts with respect to the thermoplastic elastomer by 100 mass parts. When the content of the vulcanization accelerator is less than 0.1 mass parts, the vulcanization-accelerating effect may not be obtained. On the other hand, when the content of the vulcanization accelerator exceeds 5 mass parts, the hardness of the thermoplastic resin composition may be raised, and the durability may be lowered. Further, the cost of raw material of the thermoplastic resin composition is raised. It is more preferable that the content of the vulcanization accelerator is greater than or equal to 0.3 mass parts and less than or equal to 4 mass parts.

(Thickness of Polymer Laminate)

In Second Embodiment, it is preferable that the polymer laminate has a thickness of greater than or equal to 1.6 mm and less than or equal to 4.0 mm. When the thickness of the polymer laminate is less than 1.6 mm, a favorable operation stability cannot be obtained with a pneumatic tire having the polymer sheet applied to an inner liner.

On the other hand, when the thickness of the polymer laminate exceeds 4.0 mm, a flexure of the tire is small, and favorable gripping performance cannot be obtained. Further, the tire weight and the rolling resistance are increased to lower the fuel consumption performance. It is preferable that the thickness of the polymer laminate is greater than or equal to 2.0 mm and less than or equal to 3.0 mm.

(Method for Manufacturing Polymer Laminate)

In Second Embodiment, the polymer laminate can be manufactured, for example, by the following method.

The first layer is manufactured by the method similar to the method for manufacturing the inner liner polymer sheet of First Embodiment. The second layer is manufactured by forming a sheet of the thermoplastic resin composition by the extrusion and calender molding. The polymer laminate is manufactured by attaching the first layer and the second layer to each other.

Moreover, it can be manufactured by a laminate extrusion or a co-extrusion of pellets of the polymer composition and the thermoplastic resin composition.

<Tread>

In the present embodiment, a tread can be used which is similar to the tread of First Embodiment.

<Method for Manufacturing Pneumatic Tire>

The pneumatic tire according to one embodiment of the present invention can be manufactured, for example, by the following method.

A green tire is manufactured by applying the polymer sheet and the polymer laminate described above to the inner liner portion.

Figure 2:
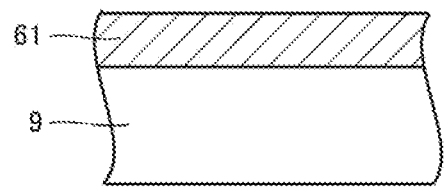
FIG. 2 is a schematic cross-sectional view representing an example of an arrangement of an inner liner in the pneumatic tire.

When the polymer sheet is used, it is so arranged that the polymer sheet forming inner liner 9 and carcass 61 are arranged to contact with each other as shown in FIG. 2, for example.

Figure 3:
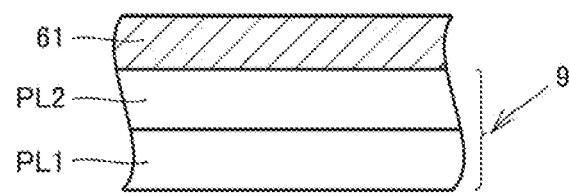
FIG. 3 is a schematic cross-sectional view representing one example of an arrangement of an inner liner in the pneumatic tire.

When the polymer laminate is used, it is arranged toward an outer side in the radius direction of the tire so that a second layer PL2 of the polymer laminate comes in contact with carcass 61 as shown in FIG. 3, for example.

With such an arrangement, in the tire vulcanization step, the second layer and an adjacent member such as a carcass or an insulation can exhibit a vulcanization adhesion. Thus, since the inner layer and the adjacent member are favorably adhered in the obtained pneumatic tire, superior air permeation resistance and durability can be provided.

Next, the green tire is mounted to a die, and pressed and heated by a bladder at 150 to 180° C. for 3 to 50 minutes, so that the vulcanized tire is obtained. Next, the obtained vulcanized tire is preferably cooled at 50 to 120° C. for 10 to 300 seconds.

The pneumatic tire has a polymer sheet or a polymer laminate applied to the inner liner. Since SIBS, SIS, SIB, epoxy modified SBS, and the like constituting the polymer sheet or polymer laminate are thermoplastic resin, when for example heated to 150 to 180° C. in the step of obtaining the vulcanized tire, it is rendered to be in a softened state in the die. Since the thermoplastic resin in the softened state improves the reactivity more than in the solid state, it is welded to the adjacent member. In other words, the inner liner in contact with an outer surface of the expanded bladder is softened by heating and welded to the bladder. If the vulcanized tire is attempted to be taken out from the die in the state where the inner liner and the outer surface of the bladder are welded, the inner liner is peeled off from an adjacent insulation or carcass, so that the air-in phenomenon may occur. Moreover, the shape of the tire itself may be deformed.

Therefore, by quenching the obtained vulcanized tire immediately at or less than 120° C. for 10 seconds or longer, the thermoplastic resin used for the inner liner can be solidified. When the thermoplastic resin is solidified, the welding between the inner liner and the bladder is eliminated, so that peeling performance at the time of taking vulcanized tire from the die is improved.

It is preferable that the cooling temperature is 50 to 120° C. When the cooling temperature is less than 50° C., it would be necessary to prepare a special cooling medium, which may deteriorate the productivity. When the cooling temperature exceeds 120° C., the thermoplastic resin is not sufficiently cooled, and the inner liner remains welded to the bladder at the time of releasing from the die, so that the air-in phenomenon may occur. It is more preferable that the cooling temperature is 70 to 100° C.

It is preferable that the cooling time is 10 to 300 seconds. If the cooling time is less than 10 seconds, the thermoplastic resin is not sufficiently cooled, and the inner liner remains welded to the bladder at the time of releasing from the die, so that the air-in phenomenon may occur. When the cool time exceeds 300 seconds, the productivity is deteriorated. It is more preferable that the cool time is 30 to 180 seconds.

It is preferable that the step of cooling the vulcanized tire is performed after cooling the bladder. Since the bladder is hollow, a cooling medium adjusted to the cooling temperature can be introduced to the bladder after the vulcanization step is terminated.

The step of cooling the vulcanized tire can be performed by providing a cooling structure to the die while cooling the bladder.

As the cooling medium, it is preferable to use one or more kind selected from the group consisting of air, steam, water, and oil. Among those, it is preferable to use water which is superior in the cooling efficiency.

EXAMPLE

<Manufacturing Tread Blend>

In accordance the blending formula shown in Table 1, compounding agents other than sulfur and vulcanization accelerator are kneaded for 3 minutes in a Bunbary mixer. Sulfur and vulcanization accelerator are kneaded into the obtained kneaded material by means of a roll, so that non-vulcanized tread rubber composition was obtained.

TABLE 1

|  |  | Manufacturing Examples | | |
|---|---|---|---|---|
|  |  | T1 | T2 | T3 |
| Compounding Agent (mass parts) | SBR(*1) | 100 | 50 | 20 |
|  | NR(*2) | — | 50 | 80 |
|  | Carbon black(*3) | 75 | 60 | 60 |
|  | Oil(*4) | 50 | 50 | 50 |
|  | Zinc Oxide(*5) | 3 | 3 | 3 |
|  | Stearic acid(*6) | 2 | 2 | 2 |
|  | Anti-aging agent(*7) | 2 | 2 | 2 |
|  | Wax(*8) | 2 | 2 | 2 |
|  | Sulfur(*9) | 1 | 1 | 1 |
|  | Vulcanization accelerator(*10) | 1 | 1 | 1 |

(Note 1)
SBR: SBR: "E15" manufactured by Asahi Kasei Corporation.
(Note 2)
NR: natural rubber, TSR 20.
(Note 3)
Carbon black: "SHOBLACK N110" (nitrogen adsorption specific surface area: 145 m$^2$/g, 115 ml/100 g) manufactured by Showa Cabot K.K.
(Note 4)
Oil: "Process X-260" manufactured by Japan Energy Corporation.
(Note 5)
Zinc oxide: "Zinc Oxide" manufactured by Mitsui Mining & Smelting Co., Ltd.
(Note 6)
Stearic acid: "stearic acid "Tsubaki"" manufactured by NOF Corporation.
(Note 7)
Anti-aging agent: "Antigene 6C" manufactured by Sumitomo Chemical Co., Ltd. (N-phenyl-N'-(1,3-dimethyl butyl)-p-phenylenediamine).
(Note 8)
Wax: "Sunnock N" manufactured by Ouchi Shinko Chemical Industrial Co., Ltd.
(Note 9)
Sulfur: "Powder Sulfur" manufactured by Karuizawa Sulfur Ltd.
(Note 10)
Vulcanization accelerator: "Nocceler CZ" manufactured by Ouchi Shinko Chemical Industrial Co., Ltd. (N-cyclohexyl-2-benzothiazolyl sulfenamide).

<Consideration of Polymer Sheet>

(Manufacturing Polymer Sheet)

According to the blending formula shown in Table 2, each compounding agent was placed into the two-axis extruder (screw diameter: φ50 mm, L/D: 30, cylinder temperature: 200° C.), and kneaded at 200 rpm to form a pellet. The obtained pellet was placed into the T-die extruder (screw diameter: φ80 mm, L/D: 50, die grip width: 500 mm, cylinder temperature: 220° C., film gauge: 4.0 mm) to create a polymer sheet having a thickness of 4.0 mm.

The obtained polymer sheet was used to conduct the following evaluation.

(Non-Vulcanization Stickiness to Carcass Layer)

A sheet of the carcass layer (blend: styrene-butadiene rubber by 100 mass parts, carbon black by 50 mass parts, sulfur by 2 mass parts, thickness: 2.0 mm) was prepared.

The polymer sheet and the sheet of the carcass layer were attached to each other, and retained at 100 gf for 30 seconds, and thereafter the force required for peeling was measured as the non-vulcanization stickiness. With the following formula, a non-vulcanization stickiness for each manufacturing example was presented as an index with Manufacturing Example 1 as a reference (100). It shows that a non-vulcanization stickiness is stronger as a non-vulcanization stickiness index is greater, and thus it is preferable.

(non-vulcanization stickiness index)=(non-vulcanization stickiness of each Manufacturing Example)/(non-vulcanization stickiness of Manufacturing Example 1)×100

(Vulcanization Adherence with Carcass Layer)

The polymer sheet and the sheet of the carcass layer are attached to each other and heated at 170° C. for 20 minutes to manufacture a sample for a vulcanization adherence measurement. The peel force was measured by a tensile peeling test to determine a vulcanization adherence. With the following formula, a vulcanization adherence of each manufacturing example was presented as an index with Manufacturing Example 1 as a reference (100). It represents that a vulcanization adherence is stronger as a vulcanization adherence index is greater, and thus it is preferable.

(vulcanization adherence index)=(vulcanization adherence of each Manufacturing Example)/(vulcanization adherence of Manufacturing Example 1)×100

The result is shown in Table 2.

TABLE 2

| | | Manufacturing Examples | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Blending (mass parts) | SIBS(*11) | — | — | 2 | 2 | 2 | 5 | 5 | 5 | 40 | 40 | 40 | 50 | 50 | 50 |
| | NR(*2) | 30 | 50 | 98 | — | — | 95 | — | — | 60 | — | — | 50 | — | — |
| | IR(*12) | — | — | — | 98 | — | — | 95 | — | — | 60 | — | — | 50 | — |
| | IIR(*13) | 70 | — | — | — | 98 | — | — | 95 | — | — | 60 | — | — | 50 |
| | SBR(*1) | — | 50 | — | — | — | — | — | — | — | — | — | — | — | — |
| | Carbon black(*14) | 50 | 100 | — | — | — | — | — | — | — | — | — | — | — | — |
| | Oil(*4) | 10 | 10 | — | — | — | — | — | — | — | — | — | — | — | — |
| | Wax(*8) | 2 | 2 | — | — | — | — | — | — | — | — | — | — | — | — |
| | Anti-aging agent(*7) | 2 | 2 | 1 | 1 | 1 | 1 | 1 | 1 | 1 | 1 | 1 | 1 | 1 | 1 |
| | Stearic acid(*6) | 2 | 2 | 3 | 3 | 3 | 3 | 3 | 3 | 3 | 3 | 3 | 3 | 3 | 3 |
| | Zinc oxide(*5) | 4 | 3 | 5 | 5 | 5 | 5 | 5 | 5 | 5 | 5 | 5 | 5 | 5 | 5 |
| | Sulfur(*9) | 0.5 | 1 | 0.5 | 0.5 | 0.5 | 0.5 | 0.5 | 0.5 | 0.5 | 0.5 | 0.5 | 0.5 | 0.5 | 0.5 |
| | Vulcanization accelerator(*15) | 1 | 2 | 1 | 1 | 1 | 1 | 1 | 1 | 1 | 1 | 1 | 1 | 1 | 1 |
| Evaluation | Non-vulcanization stickiness index with carcass layer | 100 | 110 | 95 | 95 | 92 | 93 | 93 | 91 | 70 | 70 | 67 | 65 | 65 | 63 |
| | Vulcanization adhesiveness index with carcass layer | 100 | 110 | 95 | 95 | 92 | 93 | 93 | 91 | 73 | 73 | 67 | 67 | 67 | 63 |

(Note 1), (Note 2), (Note 4) to (Note 9):
These are the same as Table 1.
(Note 11)
SIBS: "SIBSTAR 102T" manufactured by Kaneka Corporation (styrene-isobutylene-styrene triblock copolymer, weight average molecular weight 100,000, styrene unit content 25 mass %, Shore A hardness 25).
(Note 12)
IR: "Nipol IR2200" manufactured by ZEON Corporation.
(Note 13)
IIR: "Exxon Chlorobutyl 1066" manufactured by Exxon Mobil Corporation.
(Note 14)
Carbon black: "SEAST V" manufactured by Tokai Carbon Co., Ltd. (N660, nitrogen absorption specific surface area: 27 m2/g).
(Note 15)
Vulcanization accelerator: "Nocceler DM" manufactured by Ouchi Shinko Chemical Industrial Co., Ltd. (di-2-benzothiazolyl disulfide).

(Evaluation Result)

Manufacturing Examples 3 to 14 represent polymer sheets including SIBS and one kind selected from the group consisting of natural rubber, isoprene rubber, and isobutylene-isoprene rubber. As the content of SIBS increased, the non-vulcanization stickiness and the vulcanization adherence with the carcass layer were lowered. Particularly in Examples 12 to 14, the non-vulcanization stickiness and the vulcanization adherence with the carcass layer were significantly lowered as compared to Manufacturing Example 1.

(Manufacturing of Pneumatic Tire)

The non-vulcanized rubber composition was formed to have a tread shape and attached to other tire members (belt layer, side wall portion, and the like). Further, polymer sheets having the blending similar to those of Manufacturing examples 1 to 11 were prepared. The thicknesses of the polymer sheets were set to have the thicknesses shown in Table 3. Green tires were prepared by applying the polymer sheets to the inner liners of the tires. The vulcanized tires having a 195/65R15 size were manufactured by press-molding the green tires in the die at 170° C. for 20 minutes. After cooling the vulcanized tire at 100° C. for 3 minutes, the vulcanized tires were taken out from the die to obtain the pneumatic tire.

The obtained pneumatic tires were used to conduct the following evaluation.

(Air Permeation Resistance)

The manufactured tire having the 195/65R15 size was assembled to the JIS Standard Rim 15×6JJ, and an initial air pressure of 200 Kpa was contained, and the tire was left at a room temperature for 90 days, and then a lowering rate of the air pressure (%/month) was calculated. With the following formula, the air permeation resistance of each Example and Comparative example was presented by an index with Comparative Example 1-1 as a reference (100). As the index is smaller, the air permeability is smaller, thus it is preferable.

(air permeation resistance index)=(lowering rate of air pressure in each Example and Comparative Example)/(lowering rate of air pressure in Comparative Example 1-1)×100

(Operation Stability)

The pneumatic tires were mounted to all of wheels of a vehicle (FF2000cc made in Japan) and the vehicle ran the test course of about 2 km for 8 laps, and the operation stability was evaluated in accordance with a driver's sensual evaluation. The evaluation was conducted with 10 points as full points, and the relative evaluation was conducted with Comparative Example 1-1 scored 6 points. It would be favorable as the evaluation point is greater.

(Gripping Performance)

At the same time with the evaluation of the operation stability, the gripping performance was evaluated in accordance with a driver's sensual evaluation. The evaluation was conducted with 10 points as full points, and the relative evaluation was conducted with Comparative Example 1-1 scored 6 points. It would be favorable as the evaluation point is greater.

The test result is shown in Table 3.

TABLE 3

| | | Examples | | | | | | | | Comparative Examples | | | | | | | | |
|---|---|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-1 | 1-2 | 1-3 | 1-4 | 1-5 | 1-6 | 1-7 | 1-8 | 1-9 |
| Tread Polymer sheet | | T1 | T1 | T1 | T1 | T2 | T2 | T2 | T2 | T1 | T1 | T1 | T1 | T2 | T2 | T2 | T2 | T3 |
| | Manufacturing Example Number | 8 | 8 | 6 | 7 | 9 | 10 | 11 | 8 | 1 | 2 | 8 | 8 | 6 | 7 | 4 | 5 | 6 |
| | Thickness (mm) | 1.6 | 2.0 | 3.0 | 4.0 | 1.6 | 2.0 | 3.0 | 4.0 | 1.0 | 1.0 | 1.0 | 5.0 | 1.0 | 5.0 | 2.0 | 2.0 | 2.0 |

TABLE 3-continued

|  |  | Examples |  |  |  |  |  |  |  | Comparative Examples |  |  |  |  |  |  |  |  |
|---|---|---|---|---|---|---|---|---|---|---|---|---|---|---|---|---|---|---|
|  |  | 1-1 | 1-2 | 1-3 | 1-4 | 1-5 | 1-6 | 1-7 | 1-8 | 1-1 | 1-2 | 1-3 | 1-4 | 1-5 | 1-6 | 1-7 | 1-8 | 1-9 |
| Evaluation | Air permeation resistance index | 80 | 70 | 60 | 50 | 75 | 65 | 55 | 50 | 100 | 150 | 130 | 30 | 130 | 40 | 120 | 115 | 110 |
|  | Gripping performance index | 6.5 | 6.5 | 6.4 | 6.3 | 6.5 | 6.5 | 6.5 | 6.3 | 6.0 | 6.0 | 6.0 | 3.0 | 5.0 | 2.5 | 5.5 | 5.5 | 5.5 |
|  | Operation stability index | 7.0 | 8.0 | 8.5 | 9.0 | 6.5 | 7.0 | 7.5 | 8.0 | 6.0 | 6.0 | 5.5 | 9.0 | 5.0 | 8.5 | 7.0 | 7.0 | 7.0 |

(Evaluation Result)

Examples 1-1 to 1-8 are pneumatic tires using polymer sheets having a thickness of 1.6 mm to 4.0 mm. The tires had an air permeation resistance which is equal to or higher than Comparative Example 1-1, and the gripping performance and the operation stability were improved.

Comparative Examples 1-2, 1-3, and 1-5 are pneumatic tires using polymer sheets having a thickness of 1.0 mm. The air permeation resistance was worse than Comparative Example 1-1.

Comparative Examples 1-4 and 1-6 are pneumatic tires using polymer sheets having a thickness of 5.0 mm. The gripping performance was worse than Comparative Example 1-1.

Comparative Examples 1-7 and 1-8 are pneumatic tires using polymer sheets made of a polymer composition in which a polymer component includes SIBS by 2 mass %. The air permeation resistance was worse than Comparative Example 1-1.

Comparative Example 1-9 is a pneumatic tire using a tread made of a rubber composition in which a rubber component includes SBR by 20 mass %. The air permeation resistance was worse than Comparative Example 1-1.

<Consideration of Second Layer>

(Manufacturing of SIB)

Methylcyclohexane (dried with molecular sieves) of 589 mL, n-butyl chloride (dried with molecular sieves) of 613 mL, and cumyl chloride of 0.550 g were added to a 2 L reaction container having an agitator. After cooling the reaction container to −70° C., α-picoline (2-methylpyridine) of 0.35 mL and isobutylene of 179 mL were added. Titanium tetrachloride of 9.4 mL was further added, and the polymerization was stared. The solution was agitated at −70° C. and allowed to react for 2.0 hours. Next, styrene of 59 mL was added to the reaction container, and the reaction was continued for 60 minutes. After that, a large amount of methanol was added to stop the reaction. After a solvent and the like were removed from the reaction solution, the polymer was dissolved in toluene and washed twice. The toluene solution was added to a methanol mixture to deposit the polymer, and the obtained polymer was dried at 60° C. for 24 hours to obtain a styrene-isobutylene diblock copolymer.

(Manufacturing of Thermoplastic Resin Sheet)

After mixing each compounding agent in accordance with the blending formulas shown in Table 4, thermoplastic resin sheets where manufactured by the method similar to that for the polymer sheets described above. The following evaluation was conducted for the obtained thermoplastic resin sheets.

(Non-Vulcanization Stickiness to Carcass Layer)

The non-vulcanization stickiness was measured by the method which is similar to that for the polymer sheets described above, and a non-vulcanization stickiness for each Manufacturing Example was presented by an index with Manufacturing Example 1 as a reference (100). As the non-vulcanization stickiness index is greater, the non-vulcanization stickiness is stronger, thus it is preferable.

(non-vulcanization stickiness index)=(non-vulcanization stickiness of each Manufacturing Example)/(non-vulcanization stickiness of manufacturing Example 1)×100

(Vulcanization Adherence to Carcass Layer)

The vulcanization adherence was measured by the method which is similar to that for the polymer sheets described above, and the vulcanization adherence for each Manufacturing Example was presented by an index with Manufacturing Example 1 as a reference (100). As the vulcanization adherence index is greater, the vulcanization adherence is stronger, thus it is preferable.

(vulcanization adherence index)=(vulcanization adherence for each Manufacturing Example)/(vulcanization adherence for manufacturing Example 1)×100

(Evaluation Result)

The test result is shown in Table 4.

TABLE 4

|  |  | Manufacturing Examples |  |  |  |  |  |
|---|---|---|---|---|---|---|---|
|  |  | 15 | 16 | 17 | 18 | 19 | 20 |
| Blending (mass parts) | SIS(*16) | 100 | 100 | — | — | — | — |
|  | SIB(*17) | — | — | 100 | 100 | — | — |
|  | Epoxidized SBS(*18) | — | — | — | — | 100 | 100 |
|  | Stearic acid(*6) | — | 3 | — | 3 | — | 3 |
|  | Zinc oxide(*5) | — | 5 | — | 5 | — | 5 |
|  | Anti-aging agent(*7) | — | 1 | — | 1 | — | 1 |
|  | Vulcanization accelerator(*15) | — | 1 | — | 1 | — | 1 |
|  | Sulfur(*9) | — | 0.5 | — | 0.5 | — | 0.5 |

TABLE 4-continued

|  |  | Manufacturing Examples | | | | | |
|---|---|---|---|---|---|---|---|
|  |  | 15 | 16 | 17 | 18 | 19 | 20 |
| Evaluation | Non-vulcanization stickiness index with carcass layer | 50 | 80 | 50 | 95 | 55 | 100 |
|  | Vulcanization adhesiveness index with carcass layer | 50 | 80 | 50 | 95 | 55 | 100 |

(Note 5) to (Note 7) and (Note 9):
These are the same as Table 1.
(Note 15):
This is the same as Table 2.
(Note 16)
SIS: "D1161JP" manufactured by Kraton Polymers, Inc. (styrene-isoprene-styrene triblock copolymer, weight-average molecular weight of 150,000, styrene unit content of 15 mass %).
(Note 17)
SIB: SIB obtained above (Manufacturing of SIB) (styrene-isobutylene diblock copolymer, weight-average molecular weight of 70,000, styrene unit content of 15 mass %).
(Note 18)
Epoxy modified SBS: "Epofriend A1020" manufactured by Daicel Chemical Industry, Ltd. (epoxy modified styrene-butadiene-styrene, weight-average molecular weight of 100,000, weight per epoxy equivalent of 500).

Manufacturing Examples 16, 18, and 20 are thermoplastic resin sheets made of a thermoplastic resin component including SIS, SIB, or epoxy modified SBS and additive such as sulfur. The thermoplastic resin sheets had sufficient non-vulcanization stickiness and vulcanization adherence with a carcass layer.

Manufacturing Examples 15, 17, and 19 are thermoplastic resin sheets made of a thermoplastic resin composition made of SIS, SIB, or epoxy modified SBS and not including additive. The thermoplastic resin sheets had insufficient vulcanization adherence with a carcass layer.

<Consideration of Polymer Laminate>
(Manufacturing of Polymer Laminate)

Each compounding agent was placed into the two-axis extruder (screw diameter: ϕ50 mm, L/D: 30, cylinder temperature: 200° C.) in accordance with the blending formula of Manufacturing Example numbers shown in Table 5, and kneaded at 200 rpm to form a pellet. The obtained pellet was placed into a co-extruder (cylinder temperature: 200° C.) to obtain a polymer laminate constituted of two layers. A thickness of each polymer laminate was adjusted to have a thickness shown in Table 5.

(Manufacturing of Pneumatic Tire)

A non-vulcanized tread rubber composition was formed into a tread shape and attached to other tire members (such as a belt layer, a side wall portion, and the like). Further, the polymer laminate was applied to the inner liner portion of the tire to prepare a green tire. The polymer laminate had a first layer arranged at the most inner side in the radial direction of the green tire, and a second layer arranged to come in contact with a carcass layer of the green tire. The green tire was press-molded in the die at 170° C. for 20 minutes to manufacture a vulcanized tire having the 196/65R15 size. After cooling the vulcanized tire at 100° C. for 3 minutes, the vulcanized tire was taken out from the die to obtain the pneumatic tire.

The obtained pneumatic tire was used to conduct the following evaluation.

(Air Permeation Resistance)

By the method similar to Example 1-1, a lowering rate of an air pressure of the pneumatic tire was measured. With the following formula, the air permeation resistance for each Example and Comparative Example was presented by an index with Comparative Example 1-1 as a reference (100). As the index is smaller, the air permeability is smaller, thus it is preferable.

(air permeation resistance index)=(lowering rate of air pressure for each Example and Comparative Example)/(lowering rate of air pressure for Comparative Example 1-1)×100

(Operation Stability)

The pneumatic tires were mounted to all of wheels of a vehicle (FF2000cc made in Japan), and the vehicle traveled on a test course of about 2 km for 8 laps, and the operation stability was evaluated based on a driver's sensual evaluation. The evaluation was made with 10 points as full points, and a relative evaluation was conducted with Comparative Example 1-1 as scored 6 points. It is preferable when the evaluation point is greater.

(Gripping Performance)

At the same time with the evaluation of the operation stability, the gripping performance was evaluated in accordance with a driver's sensual evaluation. The evaluation was conducted with 10 points as full points, and the relative evaluation was conducted with Comparative Example 1-1 scored 6 points. It would be favorable as the evaluation point is greater.

The test result is shown in Table 5.

TABLE 5

|  |  |  | Examples | | | | | | | | Comparative Examples | | | | | |
|---|---|---|---|---|---|---|---|---|---|---|---|---|---|---|---|---|
|  |  |  | 2-1 | 2-2 | 2-3 | 2-4 | 2-5 | 2-6 | 2-7 | 2-8 | 2-1 | 2-2 | 2-3 | 2-4 | 2-5 | 2-6 |
| Tread |  |  | T1 | T1 | T1 | T1 | T2 | T2 | T2 | T2 | T1 | T1 | T2 | T2 | T3 | T3 |
| Polymer | Manufacturing | First layer | 11 | 6 | 7 | 8 | 9 | 10 | 11 | 6 | 11 | 11 | 6 | 6 | 11 | 6 |
| laminate | Example Number | Second layer | 16 | 16 | 18 | 18 | 20 | 20 | 20 | 16 | 16 | 16 | 18 | 16 | 18 | 16 |
|  | Total thickness (mm) |  | 3.0 | 1.6 | 2.0 | 3.0 | 4.0 | 1.6 | 2.0 | 3.0 | 0.4 | 5.0 | 0.4 | 5.0 | 2.0 | 2.0 |
| Evaluation | Air permeation resistance index |  | 50 | 80 | 70 | 60 | 50 | 75 | 65 | 55 | 100 | 45 | 105 | 50 | 70 | 70 |
|  | Gripping performance index |  | 6.5 | 6.5 | 6.5 | 6.5 | 6.0 | 6.0 | 6.0 | 6.0 | 5.5 | 3.5 | 6.0 | 3.0 | 3.5 | 3.5 |
|  | Operation stability index |  | 8.5 | 8.0 | 8.0 | 8.5 | 9.0 | 7.5 | 8.0 | 8.5 | 4.0 | 3.0 | 4.0 | 3.0 | 7.5 | 8.0 |

(Evaluation Result)

Examples 2-1 to 2-8 are pneumatic tires using treads having the rubber compositions of Manufacturing Examples T1, T2, polymer sheets of Manufacturing Examples 6 to 11 as a first layer, and thermoplastic resin sheets of Manufacturing Examples 16, 18, and 20 as a second layer, and applying the polymer laminate having a thickness of 1.6 mm to 4.0 mm to the inner liner. The tires had an air permeation resistance equal to or higher than Comparative Example 1-1, and the gripping performance and the operation stability were improved.

Comparative Examples 2-1, 2-3 had a polymer laminate having a thickness of 0.4 mm. The air permeation resistance of the tires were worse than Comparative Example 1-1.

Comparative Examples 2-2 and 2-4 had a polymer laminate having a thickness of 5.0 mm. The operation stability of the tires was worse than Comparative Example 1-1.

Comparative Examples 2-5 and 2-6 had the content of SBR in the tread rubber composition by 20 mass parts. The gripping performance of the tires was worse than Comparative Example 1-1.

It should be understood that the embodiments and examples disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGN LIST

1 pneumatic tire; 2 tread portion; 3 side wall portion; 4 bead portion; 5 bead core; 6, 61 carcass; 7 belt layer; 8 bead apex; 9 inner liner; PL1 first layer; PL2 second layer.

The invention claimed is:

1. A pneumatic tire comprising an inner liner made of a polymer sheet,
   said polymer sheet being made of a polymer composition,
   said polymer composition including a polymer component of styrene-isobutylene-styrene triblock copolymer by greater than or equal to 5 mass % and less than or equal to 40 mass %, and a rubber component of at least one kind selected from the group consisting of natural rubber, isoprene rubber, and isobutylene-isoprene rubber by greater than or equal to 60 mass % and less than or equal to 95 mass %, and
   said polymer composition including sulfur by greater than or equal to 0.1 mass parts and less than or equal to 5 mass parts with respect to said polymer component by 100 mass parts, and
   said polymer sheet having a thickness of greater than or equal to 1.6 mm and less than or equal to 4.0 mm, and
   a tread is made of a rubber composition including carbon black by greater than or equal to 60 mass parts and less than or equal to 200 mass parts with respect to 100 mass parts of a rubber component including styrene-butadiene rubber by greater than or equal to 50 mass %.

2. A pneumatic tire comprising an inner liner made of a polymer laminate,
   said polymer laminate including a first layer and a second layer, and
   said first layer being made of a polymer composition, and
   said polymer composition including a polymer component of styrene-isobutylene-styrene triblock copolymer by greater than or equal to 5 mass % and less than or equal to 40 mass %, and a rubber component of at least one kind selected from the group consisting of natural rubber, isoprene rubber, and isobutylene-isoprene rubber by greater than or equal to 60 mass % and less than or equal to 95 mass %, and
   said polymer composition including sulfur by greater than or equal to 0.1 mass parts and less than or equal to 5 mass parts with respect to said polymer component by 100 mass parts, and
   said second layer including a thermoplastic resin composition, and said thermoplastic resin composition including sulfur by greater than or equal to 0.1 mass parts and less than or equal to 5 mass parts with respect to thermoplastic elastomer by 100 mass parts, and
   said polymer laminate having a thickness of greater than or equal to 1.6 mm and less than or equal to 4.0 mm, and
   a tread is made of a rubber composition including carbon black by greater than or equal to 60 mass parts and less than or equal to 200 mass parts with respect to 100 mass parts of a rubber component including styrene-butadiene rubber by greater than or equal to 50 mass %.

3. The pneumatic tire according to claim 2, wherein said thermoplastic elastomer is at least one kind selected from the group consisting of a styrene-isoprene-styrene triblock copolymer, a styrene-isobutylene diblock copolymer, a styrene-butadiene-styrene triblock copolymer, a styrene-isoprene/butadiene-styrene triblock copolymer, a styrene-ethylene/butene-styrene triblock copolymer, a styrene-ethylene/propylene-styrene triblock copolymer, a styrene-ethylene/ethylene/propylene-styrene triblock copolymer, a styrene-butadiene/butylene-styrene triblock copolymer, and epoxy modified thermoplastic elastomers thereof.

4. The pneumatic tire according to claim 1, wherein said styrene-isobutylene-styrene triblock copolymer has a styrene unit content of greater than or equal to 10 mass % and less than or equal to 30 mass %.

5. The pneumatic tire according to claim 3, wherein said styrene-isoprene-styrene triblock copolymer has a styrene unit content of greater than or equal to 10 mass % and less than or equal to 30 mass %.

6. The pneumatic tire according to claim 3, wherein said styrene-isobutylene diblock copolymer has a straight-chain shape, and has a styrene unit content of greater than or equal to 10 mass % and less than or equal to 35 mass %.

7. The pneumatic tire according to claim 3, wherein said epoxy modified styrene-butadiene-styrene triblock copolymer has a styrene unit content of greater than or equal to 10 mass % and less than or equal to 30 mass %, and a weight per epoxy equivalent is greater than or equal to 50 and less than or equal to 1,000.

8. The pneumatic tire according to claim 1, wherein said polymer composition further includes stearic acid by greater than or equal to 1 mass parts and less than or equal to 5 mass parts, zinc oxide by greater than or equal to 0.1 mass parts and less than or equal to 8 mass parts, an anti-aging agent by greater than or equal to 0.1 mass parts and less than or equal to 5 mass parts, and a vulcanization accelerator by greater than or equal to 0.1 mass parts and less than or equal to 5 mass parts with respect to said polymer component by 100 mass parts.

9. The pneumatic tire according to claim 2, wherein said thermoplastic resin composition further includes stearic acid by greater than or equal to 1 mass parts and less than or equal to 5 mass parts, zinc oxide by greater than or equal to 0.1 mass parts and less than or equal to 8 mass parts, an anti-aging agent by greater than or equal to 0.1 mass parts and less than or equal to 5 mass parts, and a vulcanization accelerator by greater than or equal to 0.1 mass parts and less than or equal to 5 mass parts with respect to said thermoplastic elastomer by 100 mass parts.

10. The pneumatic tire according to claim 2, wherein said second layer further includes, in addition to said thermoplastic resin composition, a rubber component of at least one kind selected from the group consisting of natural rubber, isoprene rubber, and isobutylene-isoprene rubber, and includes said rubber component by greater than or equal to 20 mass % and less than or equal to 90 mass % with respect to a sum total of said thermoplastic resin composition and said rubber component.

11. The pneumatic tire according to claim 2, wherein said styrene-isoprene-styrene triblock copolymer has a styrene unit content of greater than or equal to 10 mass % and less than or equal to 30 mass %.

12. The pneumatic tire according to claim 2, wherein said polymer composition further includes stearic acid by greater than or equal to 1 mass parts and less than or equal to 5 mass parts, zinc oxide by greater than or equal to 0.1 mass parts and less than or equal to 8 mass parts, an anti-aging agent by greater than or equal to 0.1 mass parts and less than or equal to 5 mass parts, and a vulcanization accelerator by greater than or equal to 0.1 mass parts and less than or equal to 5 mass parts with respect to said polymer component by 100 mass parts.

* * * * *